(12) United States Patent
Chen et al.

(10) Patent No.: US 12,316,697 B2
(45) Date of Patent: May 27, 2025

(54) CONTROL METHOD AND STORAGE MEDIUM

(71) Applicant: Lenovo (Beijing) Limited, Beijing (CN)

(72) Inventors: Maogang Chen, Beijing (CN); Zhepeng Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 130 days.

(21) Appl. No.: 17/941,319

(22) Filed: Sep. 9, 2022

(65) Prior Publication Data
US 2023/0216911 A1    Jul. 6, 2023

(30) Foreign Application Priority Data

Dec. 30, 2021    (CN) .......................... 202111655791.8

(51) Int. Cl.
*H04L 67/10*    (2022.01)
*G06F 9/455*    (2018.01)
*H04L 67/025*    (2022.01)
*H04L 67/55*    (2022.01)
*H04L 67/12*    (2022.01)

(52) U.S. Cl.
CPC ........ *H04L 67/025* (2013.01); *G06F 9/45558* (2013.01); *G06F 2009/45595* (2013.01); *H04L 67/12* (2013.01)

(58) Field of Classification Search
CPC ... H04L 67/025; H04L 67/12; G06F 9/45558; G06F 2009/45595
See application file for complete search history.

(56) References Cited

U.S. PATENT DOCUMENTS

| 10,826,861 | B1* | 11/2020 | Borg | H04L 67/55 |
| 2004/0083271 | A1* | 4/2004 | Robert Tosey | H04L 51/58 709/224 |
| 2014/0019525 | A1* | 1/2014 | Takahashi | G06F 9/45558 709/203 |
| 2014/0122566 | A1* | 5/2014 | Spracklen | H04N 19/895 709/203 |
| 2015/0127716 | A1* | 5/2015 | Agrawal | G06F 9/452 709/203 |
| 2017/0359778 | A1* | 12/2017 | Chen | H04M 1/2535 |
| 2018/0121027 | A1* | 5/2018 | Kim | G06F 9/451 |
| 2018/0205715 | A1* | 7/2018 | Ingale | H04W 12/04 |
| 2020/0133694 | A1* | 4/2020 | Bosnjakovic | H04L 65/764 |
| 2020/0310858 | A1* | 10/2020 | Ren | G06F 3/04817 |
| 2024/0036807 | A1* | 2/2024 | Wu | H04L 65/1089 |

\* cited by examiner

*Primary Examiner* — Glenford J Madamba
*Assistant Examiner* — Hassan A Khan
(74) *Attorney, Agent, or Firm* — ANOVA LAW GROUP, PLLC

(57) ABSTRACT

A control method includes determining that a display interface of an application client terminal is detected to be in a first display state, sending a first trigger instruction to cause a cloud computer to transmit a first message to an electronic device in response to the first trigger instruction, receiving the first message, generating a local notification message of the electronic device based on the first message, and displaying the local notification message in the electronic device. The first message is generated according to an unread message of the cloud computer. The display interface is a remote interface of the cloud computer.

18 Claims, 10 Drawing Sheets

CONTROL METHOD AND STORAGE MEDIUM

CROSS-REFERENCE TO RELATED APPLICATION

This application claims priority to Chinese Patent Application No. 202111655791.8, filed on Dec. 30, 2021, the entire content of which is incorporated herein by reference.

TECHNICAL FIELD

The present disclosure relates to the computer technology field and, more particularly, to a control method and a storage medium.

BACKGROUND

Nowadays, an office environment is often implemented in a cloud computer. A user logs in the cloud computer through a local application client terminal from an electronic device to work, which is a safe and highly efficient way of working. However, the application client terminal has the problem that a notification message of the cloud computer cannot be displayed in time, which affects the work efficiency.

SUMMARY

Embodiments of the present disclosure provide a control method applied to an electronic device. The method includes determining that a display interface of an application client terminal of the electronic device is detected to be in a first display state, sending a first trigger instruction to cause a cloud computer to transmit a first message to the electronic device in response to the first trigger instruction, receiving the first message, generating a local notification message of the electronic device based on the first message, and displaying the local notification message in the electronic device. The first message is generated according to an unread message from the cloud computer. The application client terminal is configured to be connected with a cloud computer, The display interface is a remote interface of the cloud computer.

Embodiments of the present disclosure provide a control method. The method includes receiving a first trigger instruction sent by an electronic device, and in response to the first trigger instruction of the electronic device, transmitting a first message to the electronic device. The first trigger instruction is generated when the electronic device detects that a display interface of an application client terminal is in a first display state. The first message is generated according to an unread message of the cloud computer. The display interface is a remote interface of the cloud computer.

Embodiments of the present disclosure provide a non-transitory computer-readable storage medium. The storage medium stores a computer program that, when executed by a processor, causes the processor to determine that a display interface of an application client terminal is detected to be in a first display state, send a first trigger instruction to cause a cloud computer to transmit a first message to an electronic device in response to the first trigger instruction, transmit the first message to the electronic device, receive the first message, generate a local notification message of the electronic device based on the first message, and display the local notification message in the electronic device. The first message is generated according to an unread message of the cloud computer. The cloud computer is further configured to receive a first trigger instruction sent by an electronic device, the first trigger instruction being generated when the electronic device detects that a display interface of an application client terminal is in a first display state, and in response to the first trigger instruction of the electronic device, transmit a first message to the electronic device, the first message being generated according to an unread message of the cloud computer. The display interface is a remote interface of the cloud computer.

DETAILED DESCRIPTION OF THE EMBODIMENTS

The technical solutions of embodiments in the present disclosure are described in detail below in connection with the accompanying drawings of embodiments of the present disclosure. Apparently, described embodiments are only some embodiments of the present disclosure, rather than all embodiments. Based on embodiments in the present disclosure, all other embodiments obtained by those of ordinary skill in the art without creative efforts shall be within the scope of the present disclosure.

To solve a problem that a notification of a cloud computer cannot be displayed in time at an application client terminal, the following method may be adopted by those skilled in the art.

In a first method, a display interface of the application client terminal remains at forefront of the display interface of an electronic device.

In a second method, an audio output of the cloud computer is redirected to the electronic device where the application client terminal is installed. When the cloud computer receives a notification message, the electronic device emits a sound to notify a user.

However, the inventor finds that, with the first method, the use of the electronic device on which the application client terminal is installed may be affected, and with the second method, a surrounding user may be disturbed.

Therefore, the inventor provides a new control method, which ensures that the notification message of the cloud computer can be displayed in time, which does not affect the use of the electronic device and improves user-friendliness.

In order to make the above purposes, features, and advantages of the present disclosure easy to understand, the present disclosure is described in further detail below in connection with the accompanying drawings and specific embodiments.

Figure 1:
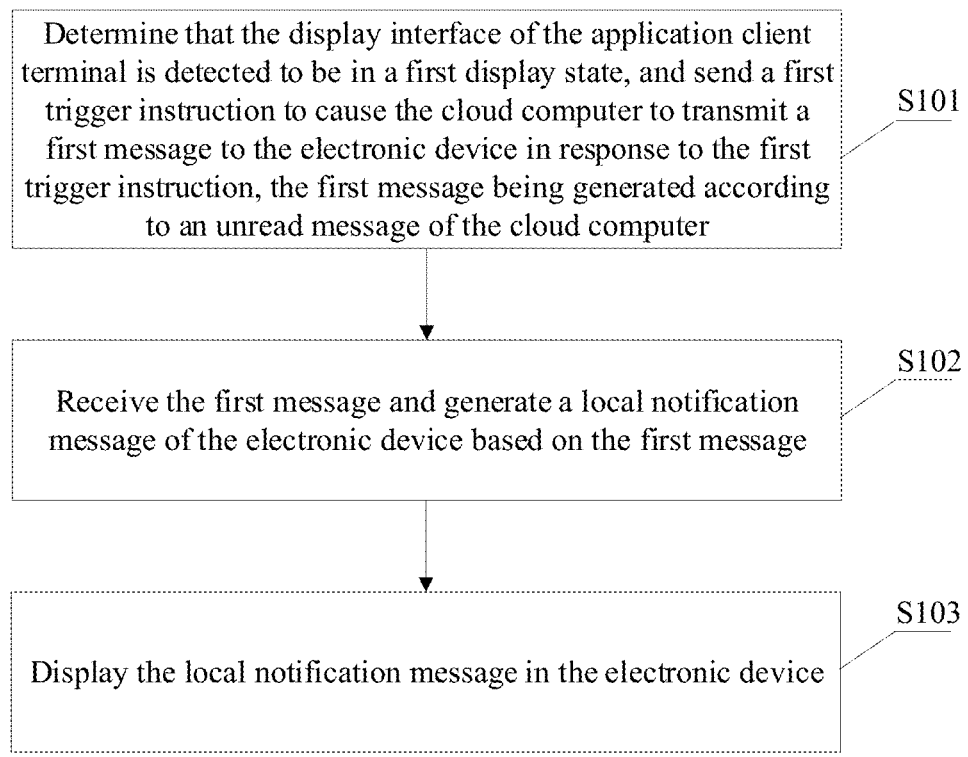
FIG. 1 illustrates a schematic flowchart of a control method according to embodiments of the present disclosure.

FIG. 1 illustrates a schematic flowchart of a control method according to embodiments of the present disclosure. The method can be applied to the electronic device. The electronic device may include the application client terminal configured to be connected to the cloud computer. The cloud computer can use the application client terminal as a virtual machine of a remote interface. The product type of the electronic device is not limited by the present disclosure. As shown in FIG. 1, the method includes but is not limited to the following processes.

At S101, the display interface of the application client terminal is determined to be in a first display state, and a first trigger instruction is sent to cause the cloud computer to transmit a first message to the electronic device in response to the first trigger instruction. The first message may be generated according to an unread message of the cloud computer.

In some embodiments, whether the display interface of the client terminal is in the first display state may be detected. When the display interface of the client terminal is in the first display state, timeliness of viewing unread messages of the cloud computer in the application client terminal may be affected.

Determining that the display interface of the application client terminal is detected to be in the first display state includes determining that a partial area of the display interface of the application client terminal is detected to be covered (S1011).

Determining that the partial area of the display interface of the application client terminal is detected to be covered includes determining that the display interface of the application client terminal is detected to be covered, and determining that a size of a covered area does not exceed a size of the display interface of the application client terminal.

Figure 2:
FIG. 2 illustrates a schematic diagram showing a coverage scenario of a display interface of an applied client terminal according to embodiments of the present disclosure.

In embodiments of the present disclosure, the display interface of the application client terminal is detected to be covered may be determined, and the covered area does not exceed the size of the display interface of the application client terminal. When any partial area of the display interface of the client terminal is covered, the first trigger instruction may be ensured to be sent to ensure the transmission efficiency of the first trigger instruction and ensure that the cloud computer can send a first message in time. For example, as shown in FIG. 2, when the display interface of the application client terminal is covered by a display interface of another application in the first partial area, the first partial area may be different from a common display area of unread messages of the cloud computer indicated by a dotted rectangular frame. The electronic device can be configured to send the first trigger instruction without further determining whether the detected covered area is related to the common display area of the unread messages of the cloud computer. Thus, the efficiency of sending the first trigger instruction may be further improved.

The common display area of the unread messages of the cloud computer can be obtained based on historical data of the unread messages of the cloud computer displayed on the display interface of the application client terminal.

Determining that the partial area of the display interface of the application client terminal is detected to be covered may also include determining that the display interface of the application client terminal is detected to be covered. The size of the covered area does not exceed the size of the display interface of the application client terminal. The covered area is associated with the common display area of the unread messages of the cloud computer.

Figure 3:
FIG. 3 illustrates a schematic diagram showing another coverage scenario of a display interface of an applied client terminal according to embodiments of the present disclosure.

As shown in FIG. 3, when the display interface of the another application covers the common area of the unread messages of the cloud computer shown in FIG. 2, the display interface of the application client terminal is determined to be covered, and the size of the covered area does not exceed the size of the display interface of the application client terminal. Moreover, when the covered area is associated with the common display area of the unread messages of the cloud computer, the transmission accuracy of the first trigger instruction may be improved. Thus, when the common display area of the unread messages of the cloud computer is ensured to be covered, the cloud computer may transmit the first message to the electronic device to reduce operations of the electronic device and the cloud computer.

Determining that the display interface of the application client terminal is detected to be in the first display state may also include determining that the display interface of the application client terminal is not at the forefront of the display of the electronic device (S1012).

In some embodiments, the present disclosure provides another method for determining that the display interface of the application client terminal is detected to be in the first display state and includes determining that the display interface of the application client terminal is in a minimized state (S1013).

The cloud computer may transmit the first message to the electronic device. The cloud computer may transmit other information (e.g., full-screen display content of the cloud computer), which is different from the first message, to the electronic device. The transmission of the first message and the transmission of the other information do not affect each other.

The unread messages of the cloud computer may include, but are not limited to, unread messages of an application of the cloud computer (e.g., unread messages of a mailbox application, unread messages of an audio and video conference application, or unread messages of an instant messaging application) and/or unread messages of an operating system of the cloud computer.

The unread messages of the application may include, but are not limited to, at least one of an icon, a title, or at least a part of text content of the application.

At S102, the first message is received, and a local notification message of the electronic device is generated based on the first message.

The local notification information of the electronic device may be controlled and output by the electronic device.

In some embodiments, based on the first message, generating the local notification message of the electronic device includes, but is not limited to, registering the first message in an operating system of the electronic device and determining the registered first message as the local notification message of the electronic device (S1021).

In some embodiments, based on the first message, generating the local notification message of the electronic device further includes, but is not limited to, parsing the first message to obtain unread message data, where the unread message data is data in the unread messages in the cloud computer (S1022) and generating the local notification message based on the unread message data (S1023).

In some embodiments, the electronic device can call an application programming interface for customizing the notification message provided by the operating system of the electronic device. The application programming interface for customizing the notification message may be configured to generate a template according to the local notification message of the electronic device, and based on the unread message data, generate the local notification message.

By parsing the first message, the unread message data may be obtained. With the method of generating the local notification message based on the unread message data, the customized local notification message can be generated to meet a personalized display requirement of the local notification message.

At S103, the local notification message is displayed on the electronic device.

In some embodiments, the local notification message may be displayed in the common display area of the notification message of the electronic device.

In some embodiments, the first area may also be selected in the display interface of the electronic device. The local notification message may be displayed in the first area. The first area may be different from the common display area of the notification message of the electronic device.

In some embodiments, when the display interface of the application client terminal is determined to be in the first display state, the first trigger instruction may be sent. Thus, the cloud computer may respond to the first trigger instruction and transmit the first message to the electronic device. The first message may be generated according to the unread message of the cloud computer. The electronic device may receive the first message and generate the local notification message of the electronic device based on the first message. The electronic device may display the local notification message. Thus, the user can view the unread message of the cloud computer on the electronic device in time to avoid missing the unread message of the cloud computer and improve office efficiency. In addition, the unread message of the cloud computer may be displayed in the electronic device as the local notification message of the electronic device, which may reduce the impact on the use of the electronic device, not disturb the surrounding user, and improve the friendliness of the notification.

Figure 4:
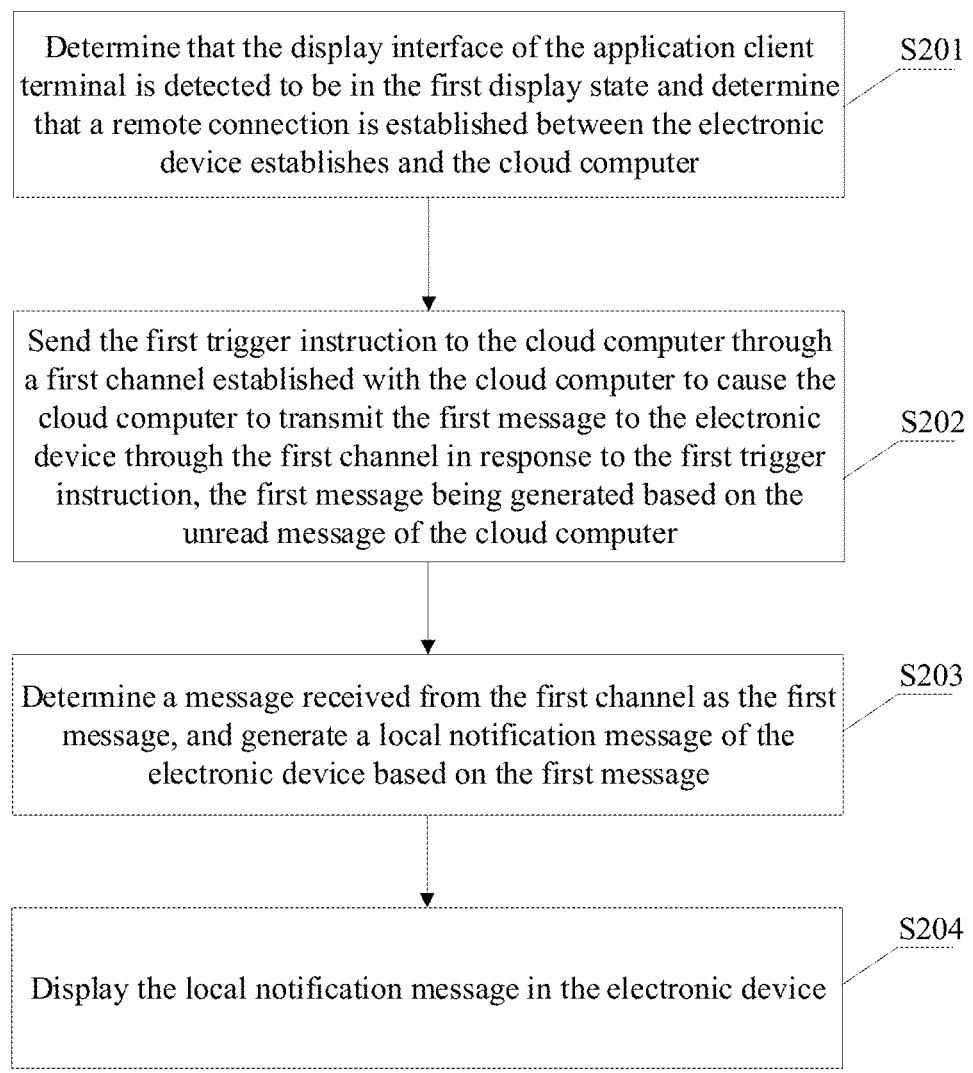
FIG. 4 illustrates a schematic flowchart of another control method according to embodiments of the present disclosure.

FIG. 4 illustrates a schematic flowchart of another control method according to embodiments of the present disclosure. The method of FIG. 4 is mainly a refinement of the control method above. As shown in FIG. 4, the method includes, but is not limited to, the following processes.

At S201, the display interface of the application client terminal is determined to be in the first display state, and a remote connection is established between the electronic device and the cloud computer.

Figure 5:
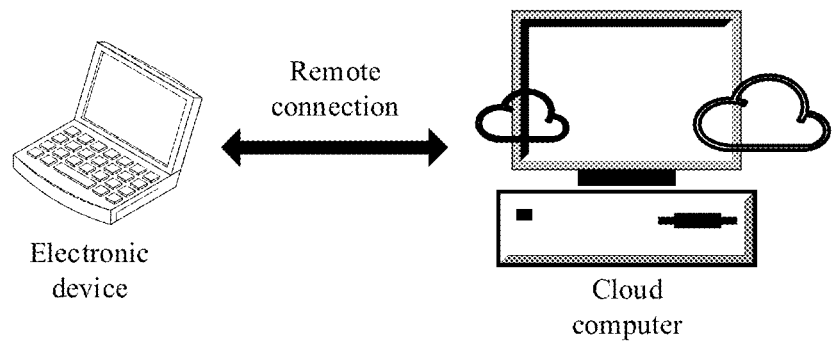
FIG. 5 illustrates a schematic diagram showing an interaction between an electronic device and a cloud computer according to embodiments of the present disclosure.

Based on the remote connection between the electronic device and the cloud computer, as shown in FIG. 5, the electronic device and the cloud computer directly exchange information with each other.

The electronic device and the cloud computer shown in FIG. 5 are only used as an example and are not intended to limit the electronic device and the cloud computer of the present disclosure.

At S202, the first trigger instruction is sent to the cloud computer through a first channel established with the cloud computer to cause the cloud computer to transmit the first message to the electronic device through the first channel in response to the first trigger instruction. The first message is generated based on the unread message of the cloud computer.

In some embodiments, the cloud computer responding to the first trigger instruction to transmit the first message to the electronic device may include the cloud computer responding to the first trigger instruction to transmit the first message to the electronic device through the first channel.

Processes S201 and S202 are an implementation of process S101 above.

At S203, a message received from the first channel is determined as the first message, and a local notification message of the electronic device is generated based on the first message.

The electronic device may receive the message from at least one channel. The at least one channel may include the first channel. The electronic device may determine to receive the message from at least one channel and determine the message received from the first channel as the first message to ensure the accuracy of the received first message.

Process S203 is a specific implementation of process S102 above.

Based on the first message, for a detailed process of generating the local notification message of the electronic device, references may be made to the relevant description above, which is not repeated here.

At S204, the local notification message is displayed on the electronic device.

For a detailed process of process S204, reference may be made to the relevant description of process S103 above, which is not repeated here.

In some embodiments, the electronic device may send the first trigger instruction to the cloud computer through the first channel. The cloud computer may transmit the first message to the electronic device through the first channel. The electronic device and the cloud computer can be ensured to transmit the first message only through the first channel. Thus, the first trigger instruction and the first message can be transmitted through the dedicated first channel. Thus, the reliability and efficiency of the transmission of the first trigger instruction to the cloud computer may be ensured and the reliability and efficiency of reception of the first message by the electronic device can be ensured. Therefore, the unread message can be ensured to be displayed on the cloud computer as the local notification message in time and reliably.

Figure 6:
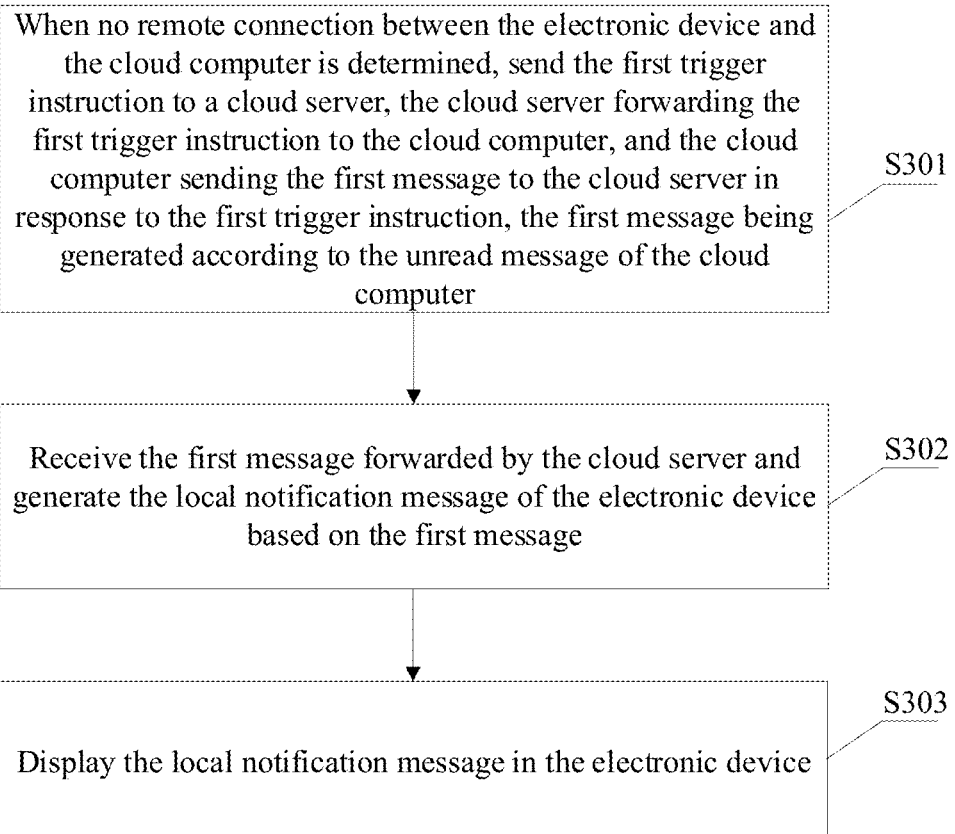
FIG. 6 illustrates a schematic flowchart of another control method according to embodiments of the present disclosure.

In some other embodiments, FIG. 6 illustrates a schematic flowchart of another control method according to embodiments of the present disclosure. The method of FIG. 6 is mainly a refinement of the control method above. As shown in FIG. 6, the method includes, but is not limited to, the following processes.

At S301, when no remote connection between the electronic device and the cloud computer is determined, the first trigger instruction is sent to a cloud server. The cloud server forwards the first trigger instruction to the cloud computer, and the cloud computer responds to the first trigger instruction and sends the first message to the cloud server. The first message is generated according to the unread message of the cloud computer.

Figure 7:
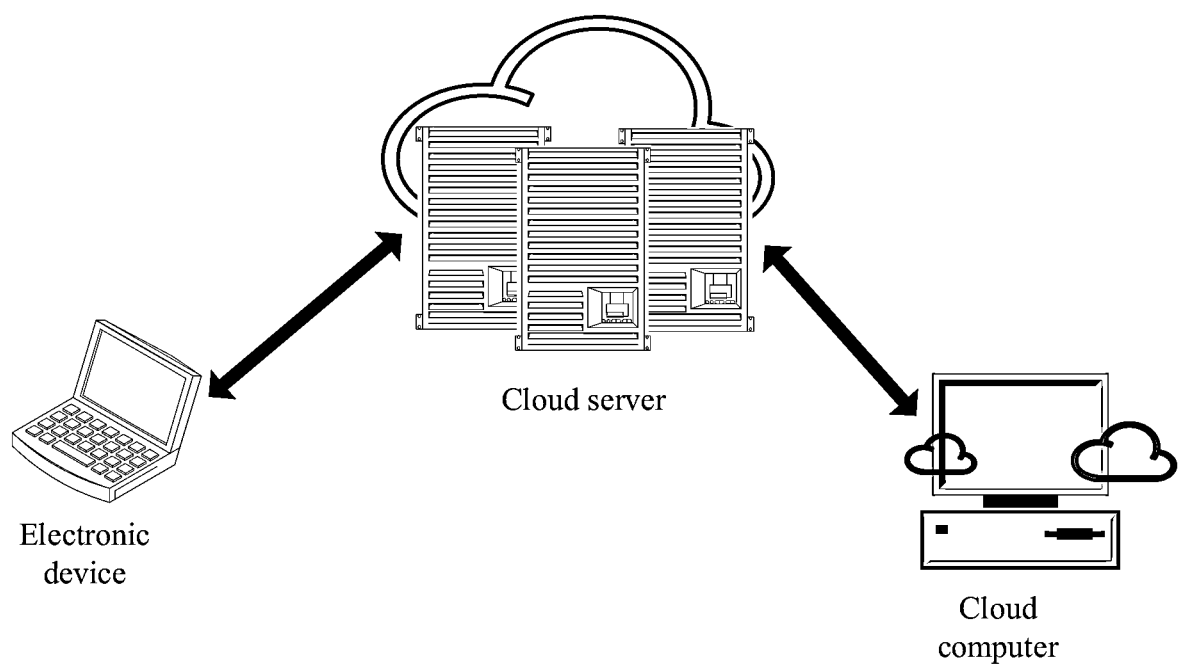
FIG. 7 illustrates a schematic diagram showing interaction among an electronic device, a cloud server, and a computer according to embodiments of the present disclosure.

In some embodiments, when no remote connection is established between the electronic device and the cloud computer, and the cloud server establishes connections to the electronic device and to the cloud computer, the cloud server can provide data service for the electronic device and the cloud computer. As shown in FIG. 7, the electronic device sends the first trigger instruction to the cloud server. The cloud server forwards the first trigger instruction to the cloud computer. In response to the first trigger instruction, the cloud computer transmits the first message to the cloud server, and the cloud server forwards the first message to the electronic device.

The electronic device, the cloud computer, and the cloud server shown in FIG. 7 are only used as an example and are not intended to limit the electronic device, the cloud computer, and the cloud server of the present disclosure.

The cloud server can establish a long connection or a short connection to the electronic device. The cloud server can also establish a long connection or a short connection to the cloud computer. A method of establishing a connection between the cloud server and the electronic device can be different from a method of establishing a connection between the cloud server and the cloud computer. For example, the cloud server can establish a long connection to the electronic device, and the cloud server can establish a short connection to the cloud computer.

By establishing the long connection between the cloud server and the electronic device and establishing the long connection between the cloud server and the cloud computer, the response speed of the cloud server, the cloud computer, and the electronic device can be improved significantly to improve the transmission speed of the first trigger instruction and the first message.

Process S301 is a specific implementation of process S101 above.

At S302, the first message forwarded by the cloud server is received, and the local notification message of the electronic device is generated based on the first message.

Process S302 is a specific implementation of process S102 above.

For a detailed process of generating the local notification message of the electronic device based on the first message, references may be made to the relevant description above, which is not repeated here.

At S303, the local notification message is displayed on the electronic device.

For the detailed process of process S303, reference may be made to the relevant description of process S103 above, which is not repeated here.

In some embodiments, no remote connection may be determined to be established between the electronic device and the cloud computer. The first trigger instruction may be sent to the cloud server, the cloud server may forward the first trigger instruction to the cloud computer, and the cloud computer may respond to the first trigger instruction to send the first message to the cloud server. The cloud server may forward the first message to the electronic device to reliably transmit the first trigger instruction and the first message. Thus, the electronic device may be ensured to receive the first message and generate the local notification message of the electronic device based on the first message. The electronic device may further display the local notification message in the electronic device. Thus, the user can view the unread message of the cloud computer on the electronic device in time, which avoids missing the unread messages of the cloud computer and improves work efficiency.

Figure 8:
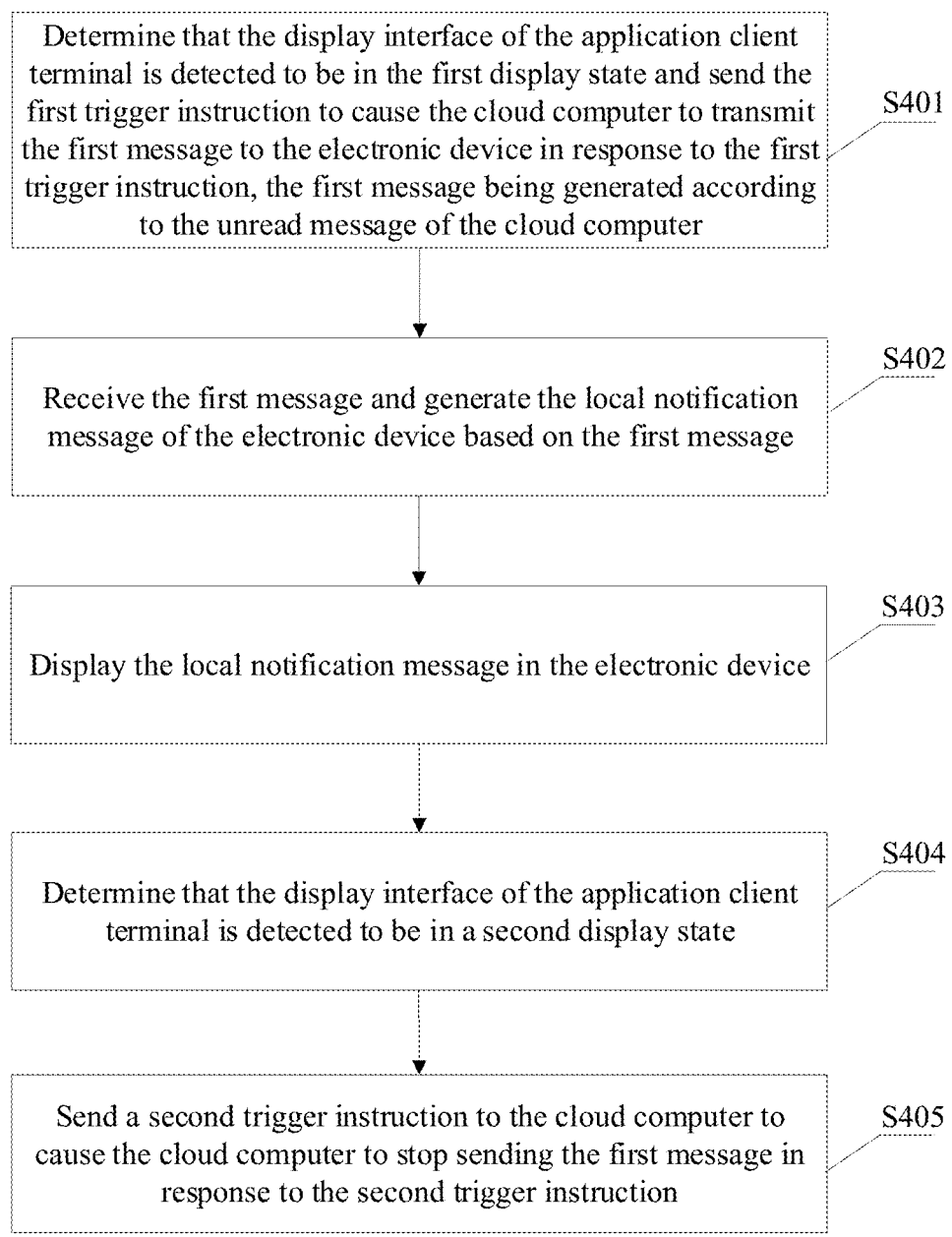
FIG. 8 illustrates a schematic flowchart of another control method according to embodiments of the present disclosure.

In some other embodiments, FIG. 8 illustrates a schematic flowchart of another control method according to embodiments of the present disclosure. The method of FIG. 8 is mainly an extension of the control method above. As shown in FIG. 8, the method includes, but is not limited to, the following processes.

At S401, the display interface of the application client terminal is determined to be in the first display state, and the first trigger instruction is sent to cause the cloud computer to transmit the first message to the electronic device in response to the first trigger instruction. The first message is generated according to the unread message of the cloud computer.

At S402, the first message is received, and the local notification message of the electronic device is generated based on the first message.

At S403, the local notification message is displayed on the electronic device.

For the detailed processes of processes S401 to S403, reference may be made to the relevant description of processes S101 to S103 above, which are not repeated here.

At S404, the display interface of the application client terminal is detected to be in a second display state is determined.

In some embodiments, after determining that the display interface of the application client terminal is detected to be in the first display state, the method may further include starting to detect whether the display interface of the application client terminal is in the second display state. The second display state is different from the first display state.

When the display interface of the application client terminal is in the second display state, the unread message of the cloud computer may be at least ensured to be viewed in time in the application client terminal.

Determining that the display interface of the application client terminal is detected to be in the second display state includes, but is not limited to, determining that the display interface of the application client terminal is detected to be in an uncovered state (S4041), or determining that an area of the display interface of the application client terminal associated with the common display area of the unread message of the cloud computer is detected to be in the uncovered state (S4042), or determining that the display interface of the application client terminal is at the forefront of the display of the electronic device (S4043).

At S405, a second trigger instruction is sent to the cloud computer to cause the cloud computer to stop sending the first message in response to the second trigger instruction.

The second trigger instruction and the first trigger instruction may be different from each other.

When the cloud computer responds to the second trigger instruction to stop sending the first message, the electronic device at least cannot receive the first message. When the cloud computer does not receive the unread message, the electronic device may display the unread message of the cloud computer in the application client terminal.

In some embodiments, when the display interface of the application client terminal is detected to be in the first display state is determined, the first trigger instruction may be sent. Thus, the cloud computer may respond to the first trigger instruction and transmit the first message to the electronic device. The first message may be generated according to the unread message of the cloud computer. The first message may be received. Based on the first message, the local notification message of the electronic device may be generated. The local notification message may be displayed on the electronic device. Thus, the user can view the unread message of the cloud computer on the electronic device in time to avoid missing the unread message of the cloud computer and improve work efficiency. In addition, the unread message of the cloud computer may be displayed as the local notification message in the electronic device, which can reduce the impact on the use of the electronic device, not disturb the surrounding user, and improve the friendliness of the notification.

The electronic device may determine to detect that the display interface of the application client terminal is in the second display state different from the first display state. The electronic device may send the second trigger instruction to the cloud computer. Thus, the cloud computer may respond to the second trigger instruction to stop sending the first message. When the cloud computer receives the unread messages, the electronic device may display the unread message of the cloud computer in the application client terminal. Thus, the unread message of the cloud computer may be ensured to be viewed in time in the application client terminal, and waste of a bandwidth resource and a calculation resource of the electronic device may be avoided.

Figure 9:
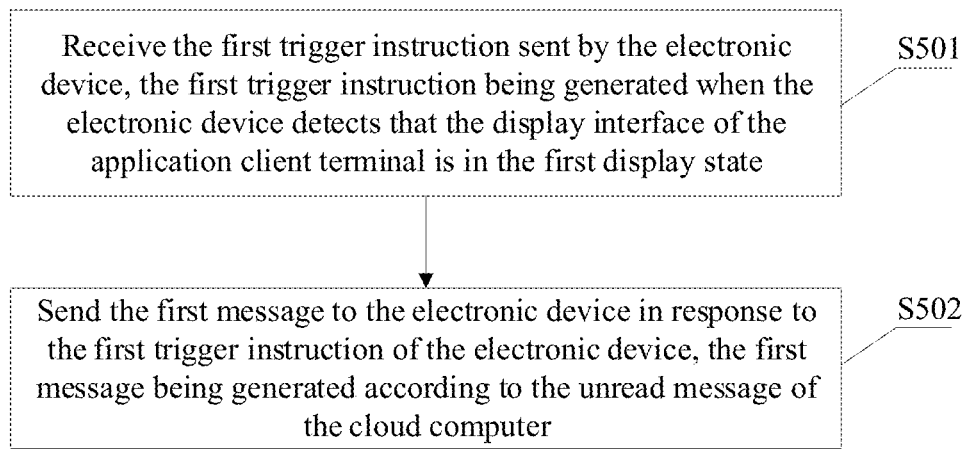
FIG. 9 illustrates a schematic flowchart of another control method according to embodiments of the present disclosure.

FIG. 9 illustrates a schematic flowchart of another control method according to embodiments of the present disclosure. The method can be applied to the cloud computer. The cloud computer may use the application client terminal of the electronic device as a virtual machine of the remote interface. As shown in FIG. 9, the method includes, but is not limited to, receiving the first trigger instruction sent by the electronic device, the first trigger instruction being generated when the electronic device detects that the display interface of the application client terminal is in the first display state (S501) and sending the first message to the electronic device in response to the first trigger instruction of the electronic device to, the first message being generated according to the unread message of the cloud computer (S502).

The electronic device may receive the first message, generate the local notification message of the electronic device based on the first message, and display the local notification message in the electronic device.

In the present disclosure, time of starting to generate the first message is not limited. In some embodiments, the cloud computer may start to generate the first message before receiving the first trigger instruction, or start to generate the first message in response to the first trigger instruction of the electronic device.

The cloud computer may start to generate the first message before receiving the first trigger instruction. Thus, the first message may be ensured to be transmitted to the electronic device in time. Moreover, the electronic device may be ensured to display the local notification message that is generated based on the first message.

Transmitting the first message to the electronic device includes, but is not limited to, determining that a remote connection is established with the electronic device (S5021) and transmitting the first message to the electronic device through the first channel established with the electronic device (S5022).

The electronic device may determine the message received from the first channel as the first channel.

For the detailed process of processes S5021 and S5022, reference may be made to the relevant description above, which is not repeated here.

In some other embodiments, transmitting the first message to the electronic device further includes determining that no remote connection is established with the electronic device (S5023) and transmitting the first message to the cloud server of the application client terminal to cause the cloud server to forward the first message to the application client terminal (S5024).

For the detailed process of processes S5023 and S5024, reference may be made to the relevant description above, which is not repeated here.

In some embodiments, the cloud computer may receive the first trigger instruction of the electronic device. The cloud computer may respond to the first trigger instruction of the electronic device to transmit the first message to the electronic device. Thus, the electronic device may generate the local notification message of the electronic device based on the first message and display the local notification message in the electronic device. Thus, the unread message of the cloud computer may not be missed, and the work efficiency may be improved. In addition, the unread message of the cloud computer may be displayed in the electronic device as the local notification message of the electronic device, which can reduce the impact on the use of the electronic device, not disturb the surrounding user, and improve the friendliness of the notification.

Figure 10:
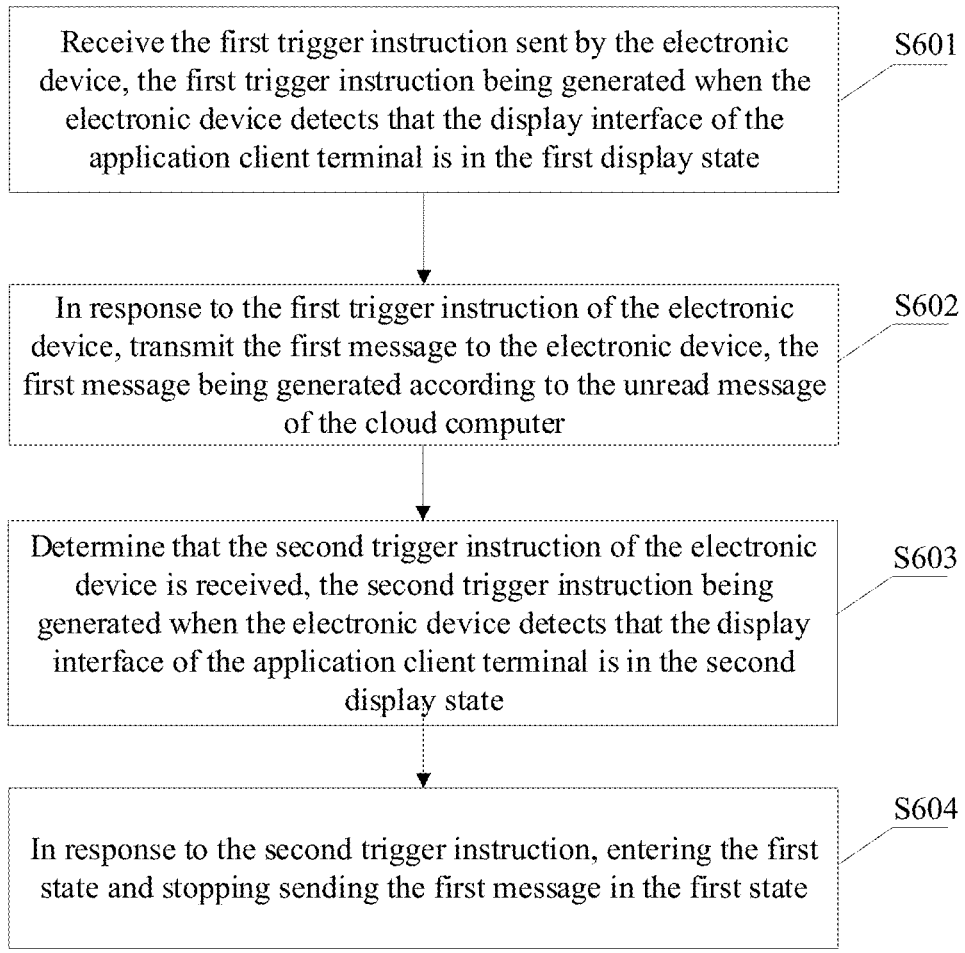
FIG. 10 illustrates a schematic flowchart of another control method according to embodiments of the present disclosure.

In some other embodiments, FIG. 10 illustrates a schematic flowchart of another control method according to embodiments of the present disclosure. The method of FIG. 10 is mainly an extension of the control method above. As shown in FIG. 10, the method includes, but is not limited to, receiving the first trigger instruction sent by the electronic device, the first trigger instruction being generated when the electronic device detects that the display interface of the application client terminal is in the first display state (S601), and in response to the first trigger instruction of the electronic device, transmitting the first message to the electronic device, the first message being generated according to the unread message of the cloud computer (S602).

For the detailed process of processes S601 and S602, reference may be made to the related description of processes S501 and S502 above, which is not repeated here.

The method further includes determining that the second trigger instruction of the electronic device is received, the second trigger instruction being generated when the electronic device detects that the display interface of the application client terminal is in the second display state (S603), and in response to the second trigger instruction, entering the first state and stopping sending the first message in the first state (S604).

In the first state, the cloud computer may stop sending the first message and continue to generate the first message.

In some embodiments, in the first state, the cloud computer may be notified to send the first message and stops generating the first message.

In the first state, the cloud computer may stop sending the first message. The electronic device at least cannot receive the first message.

In some embodiments, the cloud computer may stop sending the first message in response to the second trigger instruction. The electronic device at least cannot receive the first message. When the cloud computer receives the unread message, the electronic device may display the unread message of the cloud computer in the application client terminal. Thus, the unread message of the cloud computer may be ensured to be viewed in time in the application client terminal, and the bandwidth resource and the calculation resource of the cloud computer may not be wasted.

A control device of the present disclosure is introduced. The control device described below and the control method described above can be referred to each other correspondingly.

Figure 11:
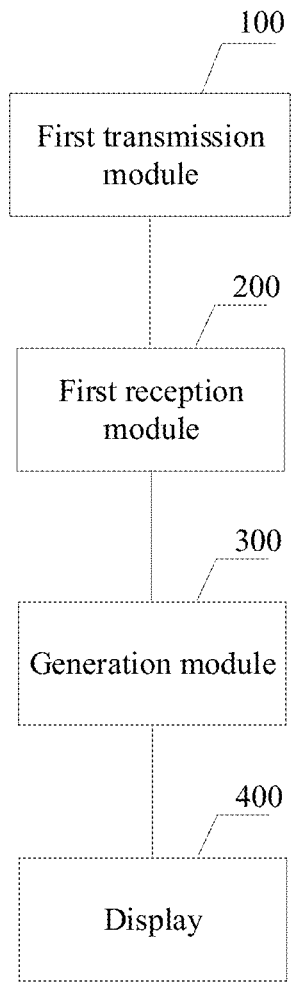
FIG. 11 illustrates a schematic structural diagram of a control device according to embodiments of the present disclosure.

As shown in FIG. 11, the control device is applied to the electronic device. The control device includes a first transmission module 100, a first reception module 200, a generation module 300, and a display 400.

The first transmission module 100 may be configured to determine that the display interface of the application client terminal is detected to be in the first display state, and send the first trigger instruction to cause the cloud computer to transmit the first message to the electronic device in response to the first trigger instruction. The first message may be generated based on the unread message of the cloud computer.

The first reception module 200 may be configured to receive the first message.

The generation module 300 may be configured to generate the local notification message of the electronic device based on the first message.

The display 400 may be configured to display the local notification message on the electronic device.

In some embodiments, the first transmission module 100 may be configured to determine that a part of the display interface of the application client terminal is detected to be covered, or determine that the display interface of the application client terminal is not at the forefront of the display of the electronic device, or determine that the display interface of the application client terminal is in a minimized state.

In some embodiments, the first transmission module 100 may be configured to determine that the remote connection is established between the electronic device and the cloud computer, and sending the first trigger instruction to the cloud computer through the first channel established with the cloud computer, or determining that no remote connection is established between the electronic device and the cloud computer. The electronic device may determine the message received from the first channel as the first message. The cloud server may be configured to forward the first trigger instruction to the cloud computer and forward the first message sent by the cloud computer to the electronic device.

In some embodiments, the control device may further include a first determination module and a second transmission module.

The first determination module may be configured to determine that the display interface of the application client terminal is detected to be in the second display state.

The second transmission module may be configured to send the second trigger instruction to the cloud computer to cause the cloud computer to stop sending the first message in response to the second trigger instruction.

In some embodiments, the generation module 300, may be configured to parse the first message to obtain the unread message data and generate the local notification message based on the unread message data. The unread message data may be the data in the unread message of the cloud computer.

Figure 12:
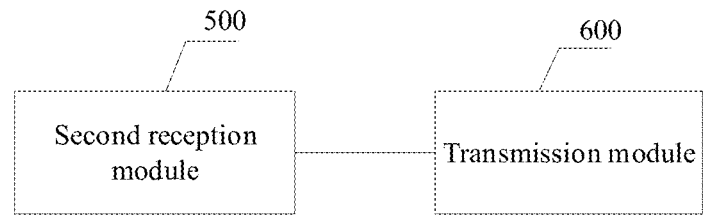
FIG. 12 illustrates a schematic structural diagram of another control device according to embodiments of the present disclosure.

As shown in FIG. 12, the control device is applied to the cloud computer. The control device includes a second reception module 500 and a transmission module 600.

The second receiving module 500 is configured to receive the first trigger instruction sent by the electronic device. The first trigger instruction may be generated when the electronic device detects that the display interface of the application client terminal is in the first display state.

The transmission module 600 may be configured to transmit the first message to the electronic device in response to the first trigger instruction of the electronic device. The first message may be generated according to the unread message of the cloud computer.

In some embodiments, the transmission module 600 may be configured to determine that a remote connection is established with the electronic device, and transmit the first message to the electronic device through the first channel established with the electronic device, or determine that no remote connection is not established with the electron device, and transmit the first message to the cloud server of the application client terminal to cause the cloud server to forward the first message to the application client terminal. The electronic device may determine the message received from the first channel to be the first message.

In some embodiments, the control device may further include a second determination module and a stopping module.

The second determination module may be configured to determine that the second trigger instruction of the electronic device is received. The second trigger instruction may be generated when the electronic device detects that the display interface of the application client terminal is in the second display state.

The stopping module may be configured to enter the first state in response to the second trigger instruction and stop sending the first message in the first state.

Corresponding to control method embodiments of the present disclosure, the present disclosure further provides an electronic device that uses the control method.

Figure 13:
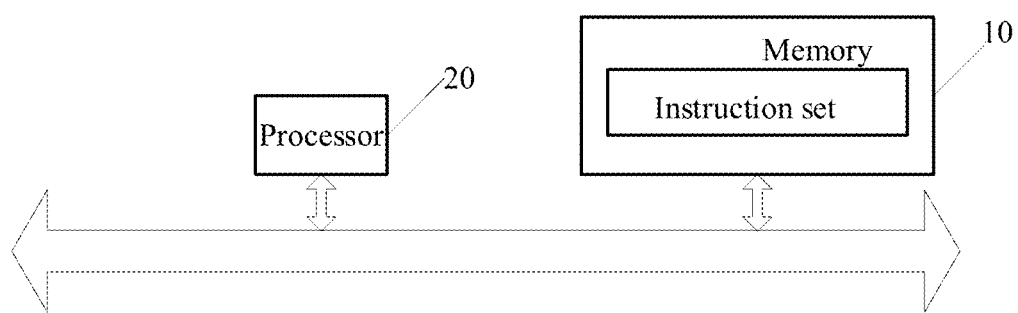
FIG. 13 illustrates a schematic structural diagram of an electronic device according to embodiments of the present disclosure.

FIG. 13 illustrates a schematic structural diagram of an electronic device according to embodiments of the present disclosure. The electronic device includes a memory 10 and a processor 20.

The memory 10 stores at least an instruction set.

The processor 20 may be configured to call and execute the instruction set in the memory 10 to perform the control method described above.

Corresponding to control method embodiments of the present disclosure, the present disclosure further provides a storage medium.

In some embodiments, the storage medium may store a computer program for implementing the control method described above. The computer program may be executed by the processor to cause the processor to implement the control method above.

Each embodiment focuses on the differences from other embodiments. The same and similar parts between the various embodiments may be referred to each other. For device embodiments, since device embodiments are basically similar to method embodiments, the description is relatively simple, and the relevant part may refer to the description of method embodiments.

In the specification, relational terms such as first and second are used only to distinguish one entity or operation from another entity or operation, and do not necessarily require or imply these entities or operations to have any such actual relationship or sequence. Moreover, the terms "comprising," "including," or any other variation thereof are intended to encompass a non-exclusive inclusion such that a process, method, article, or device comprising a list of elements includes not only those elements, but also includes other elements that are not explicitly listed or other elements inherent to such a process, method, article, or device.

Without further limitation, an element defined by the phrase "comprising a . . . " does not preclude the presence of additional identical elements in the process, method, article, or device that includes the element.

To facilitate description, the device may be divided into various modules according to the functions, which are described individually. When the present disclosure is implemented, the functions of the modules may be implemented in one or more software and/or hardware.

From the description of embodiments of the present disclosure, those skilled in the art can understand that the present disclosure can be implemented by software and a necessary general hardware platform. Based on this understanding, the essence of the technical solutions of the present disclosure or the part that contributes to the existing technology may be embodied by a software product. The computer software product may be stored in a storage medium, such as ROM/RAM, magnetic disks, CD-ROM, etc., which includes several instructions to cause the computer device (e.g., a personal computer, a server, or a network device, etc.) to execute the methods described in various embodiments or some parts of embodiments of the present disclosure.

The control method and the storage medium of the present disclosure have been described in detail. The principles and implementations of the present disclosure are described in detail with examples. The description of embodiments of the present disclosure is only used to help understand the method and core ideas of the present disclosure. Thus, for those skilled in the art, according to the concept of the present disclosure, modifications may be made to the implementation method and the application scope. In summary, the content of the specification does not limit the present disclosure.

What is claimed is:

1. A control method applied to an electronic device comprising:
   determining, by the electronic device, that a display interface of an application client terminal of the electronic device is detected to be in a first display state, the application client terminal being configured to be connected with a cloud computer, and the display interface being a remote interface of the cloud computer;
   in response to the display interface of the application client terminal being in the first display state, sending, by the electronic device to the cloud computer, a first trigger instruction to cause the cloud computer to transmit a first message to the electronic device in response to the first trigger instruction;
   receiving, by the electronic device, the first message, the first message being generated according to an unread message of the cloud computer;
   generating a local notification message of the electronic device based on the first message including:
      registering the first message in an operating system of the electronic device and determining the registered first message as the local notification message of the electronic device;
      parsing the first message to obtain unread message data, where the unread message data is data in the unread message of the cloud computer; and
      generating the local notification message based on the unread message data; and
   displaying the local notification message on the electronic device,
   wherein the first display state comprises:
      the display interface of the application client terminal being in a minimized state.

2. The method according to claim 1, wherein sending the first trigger instruction includes determining if a remote connection is established between the electronic device and the cloud computer, including:
   if the remote connection is established between the electronic device and the cloud computer, sending the first trigger instruction to the cloud computer through a first channel established with the cloud computer, the electronic device determining a message received from the first channel as the first message; and
   if the remote connection is not established between the electronic device and the cloud computer, sending the first trigger instruction to a cloud server to forward the first trigger instruction to the cloud computer; and transmitting the first message, sent by the cloud computer to the cloud server, to the electronic device by the cloud server.

3. The method of claim 1, further comprising:
   determining that the display interface of the application client terminal is detected to be in a second display state; and
   sending a second trigger instruction to the cloud computer to cause the cloud computer to stop sending the first message in response to the second trigger instruction.

4. A control method, comprising:
   receiving, by a cloud computer, a first trigger instruction sent by an electronic device, wherein the first trigger instruction is generated by the electronic device when the electronic device detects that a display interface of an application client terminal is in a first display state, the display interface being a remote interface of the cloud computer; and
   in response to the first trigger instruction of the electronic device, transmitting, by the cloud computer, a first message to the electronic device, where the first message is generated according to an unread message of the cloud computer, wherein the first display state comprises:
      the display interface of the application client terminal on a display of the electronic device being partially covered; and
   wherein the electronic device generates a local notification message of the electronic device based on the first message, including:
      registering the first message in an operating system of the electronic device and determining the registered first message as the local notification message of the electronic device;
      parsing the first message to obtain unread message data, where the unread message data is data in the unread message of the cloud computer; and
      generating the local notification message based on the unread message data.

5. The method according to claim 4, wherein transmitting the first message to the electronic device includes:
   determining that a remote connection is established with the electronic device; and
   transmitting the first message to the electronic device through a first channel established with the electronic device, the electronic device determining a message received from the first channel as the first message.

6. The method according to claim 4, wherein transmitting the first message to the electronic device includes:
   determining that no remote connection is established with the electronic device; and
   transmitting the first message to the cloud server of the application client terminal to cause the cloud server to forward the first message to the application client terminal.

7. The method according to claim 4, further comprising:
   determining that a second trigger instruction of the electronic device is received, the second trigger instruction being generated when the electronic device detects that the display interface of the application client terminal is in a second display state; and
   in response to the second trigger instruction, entering a first state, and in the first state, stopping sending the first message.

8. A non-transitory computer-readable storage medium stores a computer program that, when executed by a processor, causes the processor to:
   determine that a display interface of an application client terminal is detected to be in a first display state, the display interface being a remote interface of a cloud computer;
   send a first trigger instruction, in response to the display interface of the application client terminal being in the first display state, to cause the cloud computer to transmit a first message to an electronic device in response to the first trigger instruction;
   transmit the first message to the electronic device, the first message being generated according to an unread message of the cloud computer;
   receive the first message;
   generate a local notification message of the electronic device based on the first message; and
   display the local notification message in the electronic device; or
   receive a first trigger instruction sent by an electronic device, the first trigger instruction being generated by the electronic device when the electronic device detects that a display interface of an application client terminal is in a first display state; and
   in response to the first trigger instruction of the electronic device, transmit, by the cloud computer, a first message to the electronic device, the first message being generated according to an unread message of the cloud computer, wherein the first display state comprises:
      the display interface of the application client terminal not at forefront of the display of the electronic device; and
   wherein generating the local notification message of the electronic device includes:
      registering the first message in an operating system of the electronic device and determining the registered first message as the local notification message of the electronic device;
      parsing the first message to obtain unread message data, where the unread message data is data in the unread message of the cloud computer; and
      generating the local notification message based on the unread message data.

9. The storage medium according to claim 8, wherein the processor is further configured to determine if a remote connection is established between the electronic device and the cloud computer, wherein:
   if the remote connection is established between the electronic device and the cloud computer, sending the first trigger instruction to the cloud computer through a first channel established with the cloud computer, the electronic device determining a message received from the first channel as the first message; and
   if the remote connection is not established between the electronic device and the cloud computer, sending the first trigger instruction to a cloud server to forward the first trigger instruction to the cloud computer; and transmitting the first message, sent by the cloud computer to the cloud server, to the electronic device by the cloud server.

10. The storage medium of claim 8, further comprising:
    determine that the display interface of the application client terminal is detected to be in a second display state; and
    send a second trigger instruction to the cloud computer to cause the cloud computer to stop sending the first message in response to the second trigger instruction.

11. The storage medium according to claim 8, wherein the processor is further configured to:
    determine that a remote connection is established with the electronic device; and
    transmit the first message to the electronic device through a first channel established with the electronic device, the electronic device determining a message received from the first channel as the first message.

12. The storage medium according to claim 8, wherein the processor is further configured to:
    determine that no remote connection is established with the electronic device; and
    transmit the first message to the cloud server of the application client terminal to cause the cloud server to forward the first message to the application client terminal.

13. The storage medium according to claim 8, wherein the processor is further configured to:
    determine that a second trigger instruction of the electronic device is received, the second trigger instruction being generated when the electronic device detects that the display interface of the application client terminal is in a second display state; and
    in response to the second trigger instruction, enter a first state, and in the first state, stop sending the first message.

14. The storage medium according to claim 8, wherein the processor is further configured to:
    establish a long connection or a short connection between the cloud server and the electronic device; and
    establish a long connection or a short connection between the cloud server and the cloud computer.

15. The storage medium according to claim 14, wherein the processor is further configured to:
    establish the long connection between the cloud server and the electronic device and establish the short connection between the cloud server and the cloud computer to improve a response speed of the cloud server, the cloud computer, and the electronic device to improve a transmission speed of the first trigger instruction and the first message.

16. The storage medium according to claim 8, wherein the processor is further configured to:
    in response to a display interface of an application covering a common display area of the unread messages of the cloud computer, determine that the display interface of the application client terminal is detected to be covered, a size of a covered area not exceeding a size of the display interface of the application client terminal; and in response to the common display area of the unread messages of the cloud computer being ensured to be covered, transmit the first message to the electronic device to reduce operations of the electronic device and the cloud computer.

17. The method of claim 3, wherein determining that the display interface of the application client terminal is detected to be in the second display state includes:

determining that the display interface of the application client terminal is detected to be in an uncovered state; or determining that an area of the display interface of the application client terminal associated with a common display area of the unread message of the cloud computer is detected to be in the uncovered state; or determining that the display interface of the application client terminal is at the forefront of the display of the electronic device.

18. The method of claim 7, wherein the electronic device detects that the display interface of the application client terminal is in a second display state includes:

determining that the display interface of the application client terminal is detected to be in an uncovered state; or determining that an area of the display interface of the application client terminal associated with a common display area of the unread message of the cloud computer is detected to be in the uncovered state; or determining that the display interface of the application client terminal is at the forefront of the display of the electronic device.

* * * * *